Dec. 8, 1970  L. R. HOUGEN ET AL  3,545,959
REDUCTION OF HIGH PURITY METAL OXIDE PARTICLES
Filed March 14, 1968  3 Sheets-Sheet 1

INVENTOR.
LEIF REIDAR HOUGEN
ERLING OLAV STENSHOLT

BY Maybee & Legris

ATTORNEYS

Dec. 8, 1970   L. R. HOUGEN ET AL   3,545,959
REDUCTION OF HIGH PURITY METAL OXIDE PARTICLES
Filed March 14, 1968   3 Sheets-Sheet 3

INVENTORS
LEIF REIDAR HOUGEN
ERLING OLAV STENSHOLT
BY Maybee & Legris
ATTORNEYS

3,545,959
REDUCTION OF HIGH PURITY METAL OXIDE PARTICLES
Leif Reidar Hougen and Erling Olav Stensholt, Kristiansand, Norway, assignors to Falconbridge Nickel Mines, Limited, Toronto, Ontario, Canada, a company
Filed Mar. 14, 1968, Ser. No. 713,238
Int. Cl. B22f 9/00
U.S. Cl. 75—.5                                     14 Claims

ABSTRACT OF THE DISCLOSURE

A process for the preparation of smooth, dense, free-flowing high purity metal granules by reduction of smooth, dense, free-flowing high purity metal oxide granules. The oxide granules are contacted by a reducing gas at an elevated temperature and reduced as a moving body in the presence of minute refractory oxide particles that adhere to the smooth surfaces of the metal oxide granules and substantially prevent sintering together thereof during reduction. The concentration of minute refractory particles required to prevent intergranular sintering is so small that the purity of the reduced metal granules is similar to that of the metal oxide granules without the need for any treatment to separate refractory particles from the granules after reduction.

CROSS REFERENCE TO RELATED APPLICATIONS

The preparation of the smooth, dense, free-flowing high purity metal oxide granules whose reduction is the subject matter of the present invention is described in co-pending United States patent application No. 667,695 filed Sept. 14, 1967.

BACKGROUND OF THE INVENTION

The invention relates to the reduction of metal oxide particles to metal particles by reducing gases at elevated temperatures and more particularly to the reduction of high purity metal granules, such as nickel oxide or cobalt oxide granules, to high purity metal granules. Further reference herein to nickel and nickel oxide will be understood to apply also to cobalt and cobalt oxide.

In the preparation of metal particles by gaseous reduction of the corresponding metal oxide particles, the tendency in a body thereof for adjacent particles to sinter together during and after reduction at elevated temperature is a well recognized problem that has never been satisfactorily overcome. Prior art attempts to prevent sintering are commonly variations on the same theme of forming a mixture of the metal oxide particles with inert particles in the hope that the metal oxide particles will be prevented from sintering together during reduction thereof by the diluting effect of the inert particles amongst them. The dilution technique is so ineffective that in some cases the weight ratio of inert to metal oxide particles required to prevent sintering has to be as high as 1:1 and as a result the reduced metal particles have to be separated from the inert particles after reduction. The metal particles are finely divided, however, and while the inert particles are in some cases larger than the metal particles and in other cases smaller, the size differences are not great, and since physical separations such as screening, magnetic separation, air classification and the like are never complete, the metal product is contaminated by the inert material. Thus, one of the major disadvantages of existing processes for the reduction of metal oxide particles is a level of contamination in the reduced metal product that is quite unacceptable for high purity applications thereof.

In a specific example of the use of the dilution technique in a fluidized bed process for reducing metal oxide particles as described in United States Pat. No. 2,758,021 about 10% by weight of minus 325 mesh bone ash particles had to be mixed with a finely divided cuprous oxide powder, more than 70% of which was minus 325 mesh in size, to prevent sticking thereof during reduction, and after air classification to separate the bone ash particles from the reduced copper powder the product assayed 99.6% Cu and 0.2% bone ash. If it is assumed, as is reasonable, that the remaining 0.2% was impurity that was present in the original cuprous oxide, then it is clear that the total impurity content of the copper was doubled by the bone ash.

The present invention relates not to finely divided metal and metal oxide particles smaller than 100 mesh and predominantly smaller than 325 mesh, however, but rather to relatively large nickel and nickel oxide granules larger than 100 mesh, predominantly larger than about 48 mesh, and as large as about 8 mesh. Not only are the present nickel oxide granules relatively large but also they are smooth, dense, free-flowing and highly pure, as described in the co-pending application cited above, and, to reduce these granules without intergranular sintering to smooth, dense, free-flowing nickel granules with similar purity to that of the oxide, existing methods are inadequate.

The only known commercially available granular nickel oxide of similar particle size to that of the granules treated by the present process is a rough, knobby, relatively impure product that contains more than 2 wt. percent of impurities based on nickel metal, while the present oxide granules, on the other hand, contain less than 0.1 wt. percent of impurities on the same basis. Thus, even when fully reduced the commercial nickel product contains less than 98% nickel while the present product contains more than 99.9% nickel. No granular nickel oxide of such high purity as the present product has existed in the past and it is because of the high purity of the present material that the problem of intergranular sintering during reduction of the granules, for which the present invention is a highly advantageous solution, is thought to have arisen.

SUMMARY

The invention contemplates mixing finely divided inert refractory particles with high purity nickel oxide granules having smooth, rounded surfaces in a concentration less than the total impurity concentration of the nickel oxide granules but greater than the minimum required to avoid sintering between the granules during subsequent reduction thereof. The refractory particles are distributed evenly on the surfaces of the granules and the mixture is reduced with a reducing gas at an elevated temperature, preferably in a rotary kiln, to form a product of dense, free-flowing nickel granules with similar high purity to that of the nickel oxide granules.

The primary object of the present invention is to provide an improved nickel product that is granular, dense, smooth, free-flowing and highly pure.

Another object of the invention is to provide improved means to prevent sintering of dense, free-flowing high purity nickel oxide granules having smooth, rounded surfaces during reduction at elevated temperature.

It is a further object of the invention to prevent contamination of high purity nickel oxide granules during reduction thereof by a reducing gas at an elevated temperature to form high purity nickel granules.

DESCRIPTION OF THE PREFERRED EMBODIMENTS

Figure 1:
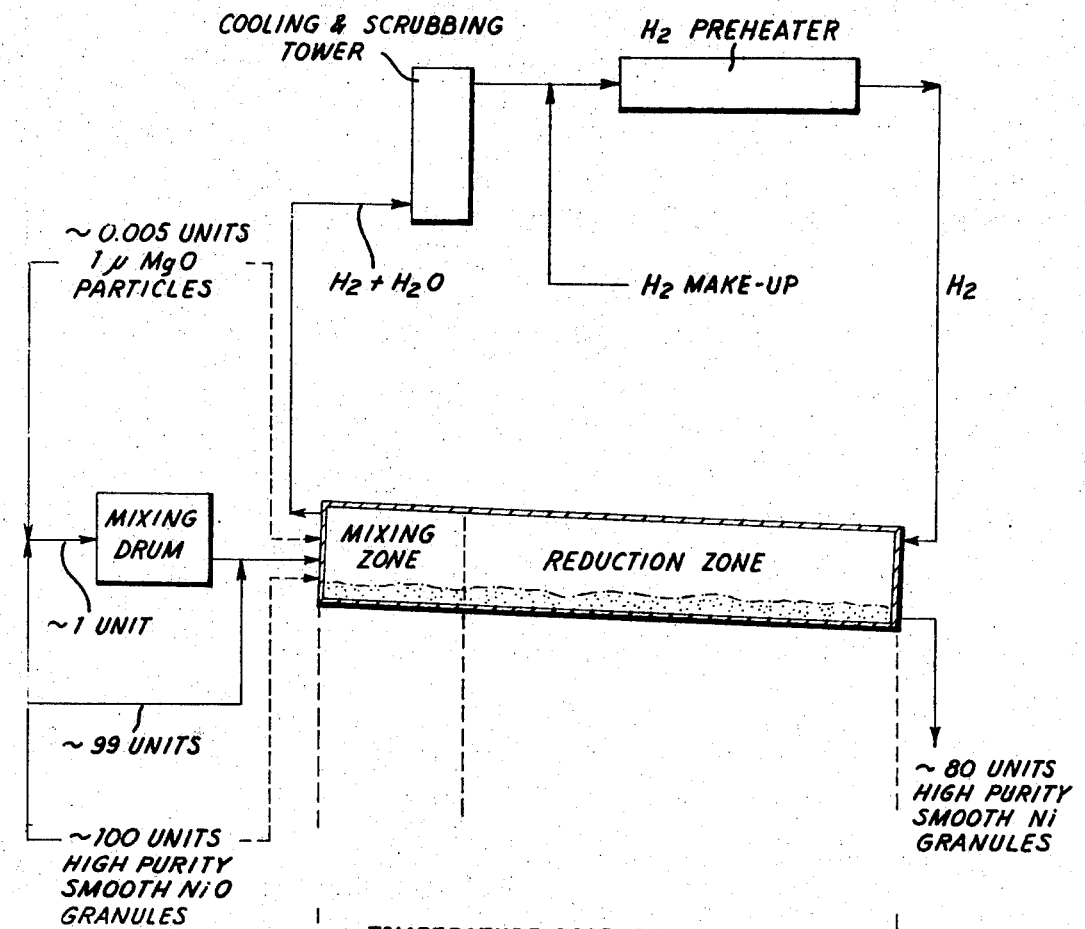
FIG. 1 is a diagrammatic representation of a preferred practice embodying the invention.

The method of the present invention relates to a special reduction treatment of dense, high purity nickel oxide granules having smooth, rounded surfaces, which are specially prepared by the process described in copending United States patent application No. 667,695, referred to hereinbefore.

Inert, refractory particles which are very finely divided, e.g., an average size in the order of one micron, are mixed with the relatively large nickel oxide granules and are substantially uniformly distributed on the surfaces thereof. The mixing is advantageously effected in two stages in which the nickel oxide granules are separated into a minor portion and a major portion, the refractory particles are mixed with the minor portion to form a relatively concentrated premixture and the major portion is then mixed with the premixture to form a mixture that is contacted with a reducing gas in a reducing zone at an elevated temperature. Thus, the minor portion can be in the order of 1% by weight of all the nickel oxide treated. The nickel oxide granules treated vary in size between about 8 and 100 Tyler mesh and advantageously between about 10 and 48 Tyler mesh. As set forth hereinbefore, the high purity nickel oxide granules treated by the present invention contain less than about 0.1% impurities.

The finely divided inert refractory particles are mixed with the nickel oxide granules in an amount by weight which is less than about 0.1% of the contained nickel but greater than the minimum required to prevent sintering between granules during reduction thereof. This minimum at reduction temperatures up to about 650° C. is between about 30 and 50 p.p.m. (parts per million). The reduction of the nickel oxide granules using a reducing gas such as hydrogen is carried out advantageously in a rotary kiln, and free-flowing nickel granules of similar high purity to that of the nickel oxide granules are formed.

While the term metal oxide granules as used herein refers to those particles undergoing reduction, the inert particles can also be metal oxides but to be inert must be refractory metal oxides that are more stable than the oxide undergoing reduction. Thus, oxides such as lime, magnesia, alumina, silica and the like are inert with respect to the reduction of the oxides of iron, nickel, copper and the like. The terms inert and refractory as used herein refer to particles that are substantially unreactive with either the metal oxide undergoing reduction or the reduced metal. Such a definition implies further that suitable particles for present purposes are either unreactive with the reducing atmosphere or at least remain in a form that is unreactive to both the metal oxide undergoing reduction and the reduced metal. It has been found that finely divided magnesia particles are advantageously utilized as the refractory particles to be mixed with the nickel oxide granules.

In addition to MgO a variety of other inert materials have been used with similar success such as CaO, $Al_2O_3$, feldspar and mixtures of MgO and $SiO_2$. Lime has been provided not only as calcium oxide but as calcium carbonate that decomposes to lime in the kiln thereby establishing that the oxide need not be supplied as such. Thus, MgO can presumably be supplied as $MgCO_3$. With the above range of tried and proven inert materials it is reasonable to expect that other naturally occurring silicate minerals, the oxides of other metals such as, for example, Ti, Cr and Zr, and mixtures thereof, should also be similarly effective in preventing sintering, but the choice in practice, being a function of availability and cost as well as of chemical and physical properties, would presumably favour the more common of the above materials. In general any material that is solid under given reducing conditions, is supplied as finely divided particles, and satisfies the conditions of inertness given earlier, is suitable for the practice of the present invention.

A preferred practice embodying the present invention is illustrated in the diagrammatic flow sheet of FIG. 1. Smooth, high purity NiO granules having an impurity content of less than 0.1% are mixed with relatively finely divided inert refractory particles, such as about 50 p.p.m. of one micron diameter MgO particles. The mixing is preferably carried out as shown in FIG. 1 by diverting a small proportion of the NiO granules, say 1% or so (1 unit) from the main feed stream (100 units) to a mixing drum in which it is blended with a metered stream of 1 micron MgO particles (0.005 unit) to form a concentrated premixture of NiO and MgO that is subsequently added to the remainder of the main stream of NiO granules (99 units) and fed to and mixed therewith in a rotary reduction kiln.

Figure 2:
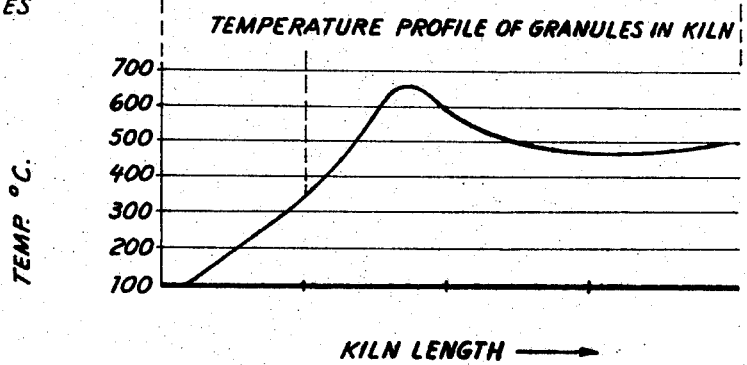
FIG. 2 is a representation of a temperature profile of the solid charge in the kiln of FIG. 1 in operation.

FIG. 2 shows a temperature profile of the granules being treated in the reduction kiln and it can be seen that temperatures are controlled so that a considerable proportion of the kiln length near the solids feed end (mixing zone) is too cool for reduction to occur and this section therefore serves effectively as a mixing zone in which the MgO particles become blended with the NiO granules and distributed substantially evenly on the surfaces thereof before reduction commences. As the granules progress through the kiln reduction begins to occur and the rate thereof increases as the temperature rises gradually to a maximum of say about 650° C., and decreases as reduction is completed with a corresponding drop in temperature. The reduced product is discharged from the kiln, cooled under a protective atmosphere to prevent reoxidation, and emerges into the open air as dense, smooth, shiny, free-flowing Ni granules that are very nearly as highly pure as the original NiO feed granules with the addition of only 50 p.p.m. or so of MgO, a relatively small additional contamination even in comparison to the small degree of contamination in the high purity NiO feed, e.g., about 0.06% or 600 p.p.m.

Hydrogen is advantageously used as a reducing gas, with the mixture of nickel oxide granules and refractory particles being fed into one end of the kiln and the reducing gas through the other end, the mixture and the gas thus passing through the kiln countercurrently. The hydrogen gas having passed through the kiln contains substantial water vapour and is therefore passed through a cooling and scrubbing tower to remove water and any dust thereby forming a depleted stream of cool, clean hydrogen. The volume of hydrogen consumed by reduction is replaced by make-up hydrogen and the replenished stream is then passed through a preheater before being returned to the kiln. This is the preferred practice of the present process but there are numerous variations that are within the scope of the invention.

It is not essential, for example, to form a concentrated premixture of the NiO granules and inert particles outside the kiln. The inert particles can be fed directly to the kiln and mixed with the NiO granules in the mixing zone thereof. The premixing procedure is preferred because metering of the inert particles with respect to the NiO granules is more readily effected in two stages than in one due to the great difference in the relative weights involved. Premixing is of particular advantage in the blending of fluffy, low-density inert particles which, when fed directly to the kiln, might be swept out in the flowing stream of reducing gas before becoming mixed with and distributed on the surfaces of the NiO granules.

In addition it is not essential that the NiO granules be completely reduced for the product to be referred to as of high purity. Pure NiO contains about 80% Ni and 20% oxygen and the proportion of this oxygen that is removed can be controlled to produce reduced granules with any specific concentrations of Ni such as 90, 98, 99 or 99.9%. While residual oxygen might be regarded as an impurity by a consumer of the product it is not so regarded for purposes of the present specification because oxygen is controlled at will to any desired concentration and is therefore in a class apart from other impurities in the reduced product. Thus the purity of the product in the present context relates only to impurities other than oxygen and the product is therefore said to be of high purity regardless of its oxygen concentration if, when completely reduced, it contains more than about 99.9% Ni, i.e., total impurities excluding oxygen are not more than about 1000 p.p.m. The concentrations of contaminants are therefore quoted and compared on the basis of Ni metal, that is, assuming complete reduction and absence of oxygen. Thus any degree of reduction at which intergranular sintering would occur in the absence of the inert particles is within the scope of this invention and the product is still referred to as of high purity herein and in the appended claims whether its oxygen content is nil, 0.1%, 2% or more.

There are other possible variations as well. For example, the temperature profile of the granules in the kiln does not have to conform to that shown in FIG. 2. Any profile is acceptable provided the desired degree of reduction is achieved and intergranular sintering is prevented. Also the recirculation of hydrogen is done for economic rather than process requirements and is therefore not an essential feature of the invention.

Having discussed some of the variables that are within the scope of the present invention, various actual reductions to practice are described in the specific examples following.

EXAMPLE 1

Smooth, dense, free-flowing high purity nickel oxide granules having an individual particle density of 6.70 g./cm$^3$, more than 98% of the theoretical density of NiO of 6.80 g./cm.$^3$, a total impurity concentration of less than 0.06% including 30 p.p.m. Mg, and a particle size distribution as shown in Table I were treated in accordance with the method of the invention.

TABLE I

| Tyler mesh | 10 | 14 | 20 | 28 | 35 |
|---|---|---|---|---|---|
| Wt. percent on | | 6 | 28 | 49 | 16 | 1 |

Figure 3:
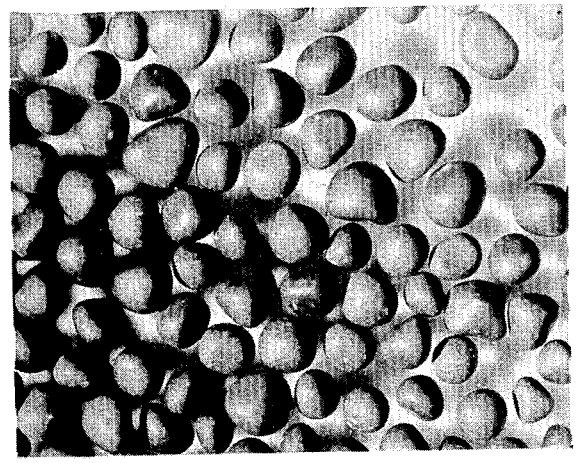
FIG. 3 is a photograph at 17× of typical nickel oxide granules treated in accordance with the method of the present invention.

The granules treated in this example are typified by those shown at 17× in the photograph of FIG. 3 of the drawings. The NiO granules were fed to the rotary reduction kiln at a rate of 70 kg./hr., 1% or 0.7 kg./hr. of which was diverted before entering the kiln to a mixer together with 3.5 g./hr. of a relatively heavy-type burnt magnesite (MgO) powder with a bulk density of about 0.7 g./cm.$^3$ and a nominal particle size of about one micron, to form an NiO-MgO mixture containing about 0.5% added MgO based on NiO. This mixture was then fed together with the remaining 69.3 kg./hr. of NiO granules into one end of a rotary kiln which was 4.0 m. long, 0.3 m. in diameter and equipped with lifters to enhance gas-solid contact and heat transfer. Total residence time in the kiln was about 2 hours during the first 30 minutes or so of which thorough mixing of the MgO and NiO occurred to produce a substantially uniform distribution of the MgO particles on the surfaces of the NiO granules at an overall concentration of 50 p.p.m. added MgO. A stream of preheated hydrogen was fed into the other end of the kiln at a rate of 60 nm.$^3$/hr. and a temperature of 650° C. and passed through the kiln countercurrently to the NiO at a linear gas velocity of about 0.5 m./sec., calculated at 500° C., thereby establishing a temperature profile for the granules along the kiln as shown in Table II.

TABLE II

| Distance from H$_2$ inlet, m | 0.5 | 1.5 | 2.5 | 3.5 |
|---|---|---|---|---|
| Temperature of granules in kiln, ° C | 470 | 500 | 650 | 190 |

Figure 4:
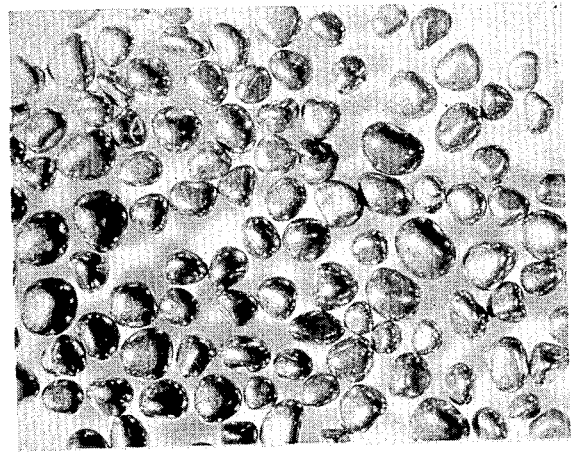
FIG. 4 is a photograph at 17× of typical nickel granules produced in accordance with the method of the invention.

Reduction occurred during a period of approximately 90 minutes at temperatures up to about 650° C. and spent reducing gas left the kiln at a temperature of 190° C. No intergranular sintering occurred in the kiln. The reduced charge was discharged from the kiln, cooled under hydrogen and then exposed to the open air as smooth, shiny, dense, free-flowing, high purity Ni granules typified by the granules shown at 17× in the photograph of FIG. 4 of the drawings, with an individual particle density of 8.85 g./cm.$^3$, more than 99% of the theoretical density of elemental Ni of 8.90 g./cm.$^3$, a total impurity concentration of about 0.06% including 63 p.p.m. Mg. and of particle sizes somewhat smaller than those of the NiO granules due to shrinkage and densification during reduction. The bulk density of the nickel granule product was 3.86 g./cm.$^3$. The increase in the Mg concentration of the reduced Ni over that of the original NiO before addition of the MgO particles was equivalent to about 90% of the added MgO particles. Thus about 90% of the added MgO particles was retained on the surfaces of the product Ni granules intergranular sintering was prevented, and the overall purity of the reduced Ni product was very nearly as high as that of the NiO feed.

EXAMPLE 2

This reduction was made under almost identical conditions to those of Example 1 except that the inert particles were a relatively light type of MgO particles about one micron in diameter with a bulk density of only 0.1 g./cm.$^3$ compared to 0.7 g./cm.$^3$ for the denser MgO of Example 1. In the present case only 30 p.p.m. of MgO was added compared to 50 p.p.m. in Example 1 and yet the reduction was effected substantially without intergranular sintering.

EXAMPLE 3

In this example, carried out under almost the same conditions as Example 1, except that reduction was effected in the presence of 50 p.p.m. of Al$_2$O$_3$ particles with a bulk density of 0.7 g./cm.$^3$, the Al concentration of the feed NiO granules before addition of the Al$_2$O$_3$ particles thereto was 15 p.p.m. while that of the product Ni granules was 45 p.p.m. indicating retention of 90% of the added Al$_2$O$_3$ on the product granules. Intergranular sintering was avoided.

EXAMPLE 4

SiO$_2$ particles were also tried in a reduction made under otherwise similar conditions to those of the preceding examples. The bulk density of the SiO$_2$ was 0.25 g./cm.$^3$ and 100 p.p.m. were added to the NiO feed but intergranular sintering occurred that was arrested and subsequently prevented upon addition of a further 35 p.p.m. of Mgo. Although the Si concentration of the NiO feed before addition of the SiO₂ particles was 15 p.p.m., that of the product granules was only 20 p.p.m. indicating retention of only 8% of the added SiO₂. Why MgO and Al₂O₃ were largely retained on the Ni granules while adherence of SiO₂ was poor is not known but the answer might lie in surface chemistry considerations, as discussed hereinafter.

EXAMPLE 5

To determine the effect of temperature on the concentration of inert particles required to prevent intergranular sintering a series of small-scale, static batch tests was performed in the laboratory. Batches of about 3.5 gm. of high purity NiO granules were shaken in vials with different amounts of micron-size MgO particles corresponding to concentrations up to 200 p.p.m., then reduced in small recrystallized alumina crucibles in flowing hydrogen at various temperatures between 500 and 1100° C. for one hour, and finally cooled in hydrogen before exposure to the open air. The crucibles were then tipped over to pour out the reduced nickel granules which were judged to be sintered or not sintered. The results are tabulated in Table III.

TABLE III

| | Not sintered, T., ° C. | Sintered, T., ° C. |
|---|---|---|
| MgO with NiO, p.p.m.: | | |
| 0 | | 550 |
| 50 | (600) | 750 |
| 100 | 750 | 800 |
| 200 | 1,000 | 1,050 |

These results show clearly that the higher the temperature the more MgO is required to prevent intergranular sintering or conversely the more MgO that is used the higher the temperature can be without sintering. Why greater concentrations of inert particles are required the higher the reduction temperature is not known but might conceivably be due to the ductility of the reduced nickel. The hotter and softer the nickel, presumably the more readily the inert particles are depressed into the surfaces of the nickel granules; therefore the less effective they are in keeping the granules apart, and thus the more of them are required to prevent direct contact between granules and the sintering that can result therefrom. The concentrations of inert particles required at commercial operating temperatures of up to about 650° C., however, are sufficiently small that negligible contamination of the product results and therefore the need for greater concentrations of inert particles at higher temperatures is not in practice a real limitation of the invention.

The method of the invention is seen to produce a novel high purity nickel product of smooth, shiny, dense, free-flowing nickel granules with a total impurity content of less than about 0.1%, excluding oxygen. The nickel product granules have finely divided inert refractory particles, e.g. one micron diameter MgO particles, evenly distributed over and adhering to the surfaces thereof, the weight of the refractory particles being less than the total of other impurities, excluding oxygen, in the nickel granules. The nickel granule product has a bulk density of about 4 g./cm.³ and a particle size of about 8 to 100 Tyler mesh, advantageously 10 to 48 Tyler mesh, and the granules have smooth and rounded surfaces.

EXAMPLE 6

Tests were performed on the high purity nickel oxide granules treated by the method of the present invention and on the rough, knobby, relatively impure commercial nickel oxide granules as discussed hereinbefore. These comparative tests were conducted to illustrate the relative tendency to intergranular sintering of the two oxides during reduction and were performed on the −28+35 mesh fraction of both. As shown in Table IV the present product was found to be sintered in a test conducted at about 550° C. while the commercial product became sintered between 750 and 850° C., more than 200° C. above the temperature at which sintering was detected between the purer granules. Sintering of the impure product is inhibited presumably because of the inert impurity content thereof which is many times greater than that of the present product, as shown in Table IV below, even after additions of inert particles have been made thereto to prevent sintering during reduction in accordance with the present invention.

TABLE IV

| Nickel oxide granules | Impurity concentration, wt. percent | | Not sintered, T., ° C. | Sintered, T., ° C. |
|---|---|---|---|---|
| | Total | Inert | | |
| Commercial | ∼2.2 | ∼0.75 | 750 | 800 |
| Present | ∼0.06 | ∼0.02 | | 550 |

It is of interest to speculate as to how intergranular sintering is prevented in the presence of such minute concentrations of such small inert particles. If the function of the inert particles is to prevent direct contact between adjacent NiO granules then adherence of the particles to the surfaces of the granules would appear to be of critical importance since each minute particle would have a greater separating effect when in direct contact with an NiO granule at all times than when disposed at times ineffectively in the relatively large void spaces among granules.

How adherence of the particles to the granules is effected is not known but there are several reasonable explanations. Some of the particles might be lodged in microporosities in the surfaces of the granules, for example, but it is thought that most adhere by electrostatic forces or other attractions resulting from the chemical properties of the particle surfaces involved. The particles thus disposed on the surfaces of the granules are free to move about thereon and to transfer from one granule to another as indicated by the rapid mixing that has been observed to occur. The voids among the granules probably play a part in the initial distribution of the small particles among the granules but when sufficient mixing has occurred that each particle is disposed on the surface of a granule it is suspected that further distribution of the particles occurs by transfer from one granule to another when the surfaces of two granules are in simultaneous contact with the same inert particles. In any case mixing is sufficiently uniform to prevent intergranular sintering although, even assuming completely uniform distribution, it is still surprising that sintering is prevented by such minute concentrations of inert particles. The following considerations might be significant in explaining this phenomenon.

Figure 5:
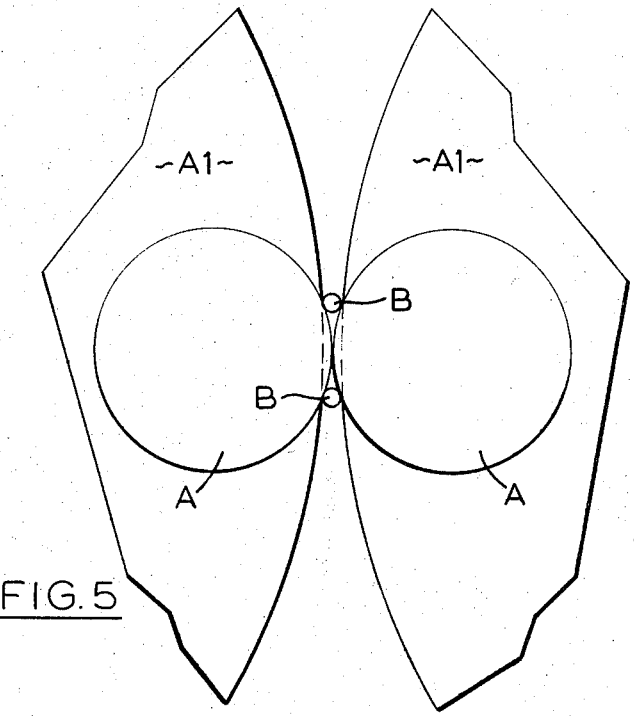
FIG. 5 is a schematic representation of two sizes of nickel oxide granules in contact with relatively small refractory particles of the same size illustrating the effect of size ratio therebetween.

Referring to FIG. 5 of the drawings, inert particles B and NiO granules A and A1 are represented ideally as spheres. Two inert particles B are separated by a distance such that the two NiO granules A, in simultaneous contact with both B particles, are also in contact with each other and could therefore presumably sinter together during reduction. Two larger metal oxide granules A1, on the other hand, are also in touch with both B particles but not with each other and are therefore presumably prevented from sintering together. Furthermore, the B particles could be farther apart without the A1 particles touching. Thus according to this explanation, the NiO granules do not have to be completely covered with inert particles for sintering to be prevented. It is apparently necessary only that the spacing among inert particles be sufficient in relation to the curvature of the NiO granules to prevent direct contact of two NiO surfaces or to minimize it to such a degree that sintering is substantially avoided. Furthermore, the larger the difference in the size of the NiO granules and the inert particles the smaller the proportion of the weight of the granules that must be present as inert particles to prevent sintering.

To gain some appreciation of the actual distributions of inert particles on the NiO granules consider the case of Example 1 in which 50 p.p.m. of one micron diameter MgO particles were added to the NiO granules. Considering a typical granule to be 0.5 mm. in diameter or about 32 Tyler mesh in size, and assuming that the MgO particles are disposed individually on the surface thereof, calculation shows that at a concentration of 50 p.p.m. only about 1/64 of the surface of the granule is covered. Even assuming the particles are uniformly distributed on the surface of the granule, such a small proportion thereof is covered that it again seems surprising that sintering is prevented.

Figure 6:
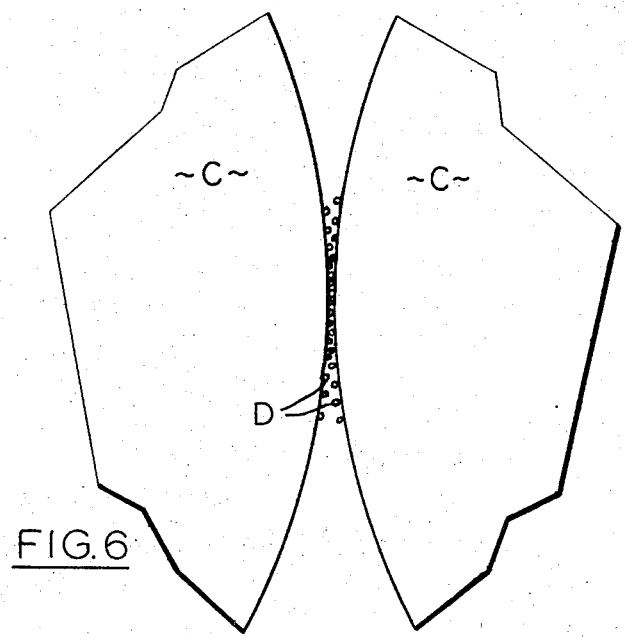
FIG. 6 is a schematic representation of a typical true size ratio between nickel oxide granules treated by the method of the invention and relatively finely divided refractory particles located on the surfaces of the granules.

Referring to FIG. 6 of the drawings, a sketch to scale depicts the uniform distribution of ideally spherical one micron diameter MgO particles spaced to cover 1/64 of the surfaces of ideally spherical 0.5 mm. diameter NiO granules, corresponding to the situation described above. It is clear that the NiO granules cannot touch one another and therefore presumably cannot sinter together during reduction. In a real case distribution is not strictly uniform, however, since some inert particles are probably agglomerated into composites each of which behaves as one larger particle, and neither the refractory particles nor the NiO granules are perfect spheres. Thus in reality the possibilities of direct contact and intergranular sintering are greater than in the ideal case for any given overall concentration of inert particles, but nevertheless it is an experimentally established fact that sintering is prevented when only a small proportion of the surface of the NiO granules could possibly be covered by the minute quantity of inert particles dispersed thereon.

Presumably an important factor in this regard is the smooth, regular, well-rounded surface of the NiO granules themselves. It will be readily appreciated that were the surfaces of the NiO granules rough and irregular, some of the tiny inert particles would collect in concavities on the surfaces of the granules where they would be ineffective in preventing direct contact and intergranular sintering of the granules and therefore more inert particles would presumably have to be added to the mixture. Thus a major factor in the success of the present invention is the advantageously smooth, regular, well-rounded surface characteristic that has been built into the NiO granules according to the process described in the copending application No. 667,695, referred to hereinbefore.

While it is reasonable to suggest that the prevention of intergranular sintering is a function of the size and number of inert particles relative to the size and number of NiO granules, prevention of contamination of the NiO granules, which is another major object of this invention, is a function of the weight of the inert particles relative to that of the metal oxide granules. For any given number and size of inert particles the denser the particles the greater their weight and therefore the greater the contamination resulting therefrom. Thus while intergranular sintering can be prevented by any one of a variety of different inert materials the preferred material is that one for which the least relative weight is required to prevent sintering, other conditions and circumstances being similar. This fact is brought out by comparison of the data of Examples 1 and 2, in which only 30 p.p.m. of the lighter MgO was required while 50 p.p.m. of the heavier MgO was needed.

The concentration of inert particles required in the feed depends also on the degree of adherence of the particles to the NiO granules. Some powders, such as the $SiO_2$ referred to in Example 4, have relatively little tendency to adhere to the granules so that only 8% are retained thereon while 92% are swept away in the reducing gas stream. Thus, to achieve a concentration of say 50 p.p.m. $SiO_2$ on the granules would presumably require about 700 p.p.m. of $SiO_2$ in the feed. Furthermore some finely divided $SiO_2$ and MgO powders appear to adhere to themselves as much or more than to the granules and therefore agglomerate into balls after prolonged tumbling during mixing. Such agglomerates would presumably be less effective in preventing contact and sintering of the granules in the kiln than individual particles adhering to the metal oxide granules so that again more inert particles would probably have to be supplied to compensate for this effective loss.

Thus ample evidence is presented to show that by mixing dense, smooth, high purity NiO granules with micron-size refractory particles that are many times smaller in diameter than the NiO granules and adhere naturally thereto without any binders or other aids, sintering is prevented when the total weight of the refractory particles is small not only relative to that of the NiO granules but even to that of the total impurities contained therein.

The surprising feature of the invention is that such small concentrations of inert particles are required to prevent sintering according to this invention that the resulting nickel granules are of similar high purity to that of the nickel oxide granules without any additional handling or treatment being required to separate the inert particles from the reduced nickel granules. The essential feature of the invention is that the finely divided refractory particles adhere to the surfaces of the smooth nickel oxide granules because it is only under this circumstance that sintering is prevented with such minute concentrations of inert particles that the purity of the nickel product is substantially the same as that of the nickel oxide. It is to be noted that the concentrations of inert particles contained in the nickel granule product resulting from the practice of the present invention are much less than those in the products of prior art methods for reducing metal oxides even after classification, washing or other treatments have been carried out to separate the inert particles from the prior art metal product.

What we claim as our invention is:

1. A method for producing smooth, dense, free-flowing, high purity granules of a metal from the group comprising nickel and cobalt, the granules containing less than 0.1% total impurities, comprising:
    (1) preparing dense, high purity relatively large granules of a metal oxide from the group comprising nickel oxide and cobalt oxide having smooth rounded surfaces,
    (2) mixing into a body thereof relatively finely divided inert refractory particles in concentration less than the total impurity concentration of the metal oxide granules but at least about 30 p.p.m., and distributing them substantially evenly on the surfaces of the relatively large granules,
    (3) contacting the mixed body of granules and refractory particles with a reducing gas in a reducing zone at an elevated temperature, and
    (4) reducing the granules substantially without intergranular sintering thereof to free-flowing metal granules of similar high purity to that of the metal oxide granules.

2. A method according to claim 1 in which high purity nickel oxide granules are reduced to high purity nickel granules.

3. A method according to claim 1 in which the mixing is effected in two stages by separating the metal oxide granules into a minor portion and a major portion, mixing the refractory particles with the minor portion to form a relatively concentrated premixture and then mixing the major portion with the premixture to form the mixture that is treated in the reducing zone.

4. A method according to claim 3 in which the minor portion is about 1% by weight of all the metal oxide granules treated.

5. A method according to claim 1 in which the refractory particles are selected from the group MgO, $MgCO_3$, CaO, $CaCO_3$, $Al_2O_3$, $SiO_2$ and mixtures thereof.

6. A method according to claim 1 in which the refractory particles are MgO.

7. A method according to claim 1 in wihch the metal oxide granules vary in size between about 8 and 100 Tyler mesh.

8. A method according to claim 1 in which the metal oxide granules vary in size between about 10 and 48 Tyler mesh.

9. A method according to claim 1 in which the refractory particles have an average size of about one micron.

10. A method according to claim 1 in which the mixture is contacted with a reducing gas in a rotary kiln.

11. A method according to claim 10 in which the mixture of metal oxide granules and refractory particles is fed into one end of the kiln, the reducing gas is fed into the other end of the kiln and the mixture and gas pass through the kiln countercurrently.

12. A method according to claim 1 in which the reducing gas is hydrogen.

13. A method according to claim 11 in which the temperature of the mixture in a section of the kiln at the end into which the mixture is fed is controlled to be too low for any significant reduction to occur so that mixing of the metal oxide granules and the refractory particles is effected in this section of the kiln substantially before reduction commences.

14. A method according to claim 1 in which the maximum temperature of the granules is decreased with the concentration of inert particles thereon and is controlled at less than about 650° C. when the concentration of inert particles thereon is less than about 50 p.p.m.

References Cited

UNITED STATES PATENTS

| | | | |
|---|---|---|---|
| 1,878,589 | 9/1932 | Marris et al. | 75—0.5 |
| 2,606,110 | 8/1952 | Berge | 75—0.5 |

L. DEWAYNE RUTLEDGE, Primary Examiner

W. W. STALLARD, Assistant Examiner